United States Patent
Shukla et al.

(10) Patent No.: US 10,049,030 B2
(45) Date of Patent: Aug. 14, 2018

(54) SYSTEM AND METHOD FOR TEST OUTPUT EVALUATION OF A JAVA COMPONENT

(71) Applicant: Infosys Limited, Bangalore (IN)

(72) Inventors: Rakesh Shukla, Gujarat (IN); Shruti Bansal, Rajasthan (IN)

(73) Assignee: Infosys Limited, Bangalore (IN)

( * ) Notice: Subject to any disclaimer, the term of this patent is extended or adjusted under 35 U.S.C. 154(b) by 90 days.

(21) Appl. No.: 13/969,456

(22) Filed: Aug. 16, 2013

(65) Prior Publication Data

US 2014/0082591 A1    Mar. 20, 2014

(30) Foreign Application Priority Data

Sep. 18, 2012  (IN) ............................ 3891/CHE/2012

(51) Int. Cl.
G06F 9/44 (2018.01)
G06F 11/36 (2006.01)

(52) U.S. Cl.
CPC ...... G06F 11/3668 (2013.01); G06F 11/3692 (2013.01)

(58) Field of Classification Search
CPC .................................................. G06F 11/3668
USPC ........................................................ 717/124
See application file for complete search history.

(56) References Cited

U.S. PATENT DOCUMENTS

| | | | |
|---|---|---|---|
| 5,434,978 A * | 7/1995 | Dockter et al. .............. | 709/230 |
| 6,775,824 B1 | 8/2004 | Osborne, II et al. | |
| 7,076,713 B1 | 7/2006 | Hess | |
| 7,996,819 B2 | 8/2011 | Okada | |
| 2004/0210866 A1* | 10/2004 | Friedman et al. ............ | 717/106 |
| 2006/0195822 A1* | 8/2006 | Beardslee ........ | G01R 31/31705 717/124 |
| 2007/0168940 A1* | 7/2007 | Lunawat ....................... | 717/108 |
| 2007/0277163 A1* | 11/2007 | Avresky ....................... | 717/140 |
| 2008/0184206 A1* | 7/2008 | Vikutan ........................ | 717/127 |
| 2009/0077074 A1* | 3/2009 | Hosokawa ........ | G06F 17/30943 |
| 2009/0320045 A1* | 12/2009 | Griffith ................... | H04L 67/34 719/315 |

(Continued)

OTHER PUBLICATIONS

Michael Silverstein, Component Testing with Intelligent Test Artifacts, SilverMark, Inc.

(Continued)

*Primary Examiner* — Li B Zhen
*Assistant Examiner* — Bradford F Wheaton
(74) *Attorney, Agent, or Firm* — Klarquist Sparkman, LLP

(57) ABSTRACT

A method and a system for test output evaluation of a JAVA component. The java component and reference classes are received and non-private members of the Java component are identified using JAVA reflection API and the reference classes. An API structure comprising public members is extracted from the non-private members. Behavior checking expressions are received and selected corresponding to the public members. A Java source code comprising wrapper methods wherein the wrapper method corresponds to the one or more public members and a test output evaluation method comprising the behavior checking expressions is generated. The test output evaluation of the JAVA component is performed using the test output evaluation method over the generated Java source code.

17 Claims, 5 Drawing Sheets

(56) References Cited

U.S. PATENT DOCUMENTS

2011/0247016 A1* 10/2011 Seong ..................... G06F 8/447
719/328
2013/0152154 A1* 6/2013 Xiao ....................... G06F 21/00
726/1

OTHER PUBLICATIONS

James M. Clarke, Automated Test Generation From a Behavioral Model, Software Quality Week Conference, May 1998.

* cited by examiner

SYSTEM AND METHOD FOR TEST OUTPUT EVALUATION OF A JAVA COMPONENT

RELATED APPLICATION DATA

This application claims priority to India Patent Application No. 3891/CHE/2012, filed Sep. 18, 2012, the disclosure of which is hereby incorporated by reference in its entirety.

FIELD OF THE INVENTION

The invention relates to the area of software testing evaluation and more particularly, to a system and a method for test output evaluation of a JAVA component.

BACKGROUND

Software testing is a primary process to determine errors and failures in order to improve software quality and reliability. However, software testing is the most expensive process in terms of finance, resources and time. Generally, testing consumes major part of the total cost of a software development project. The companies with high process maturity levels and excellent measurement data are also unable to address the issue of high cost of testing. Schedule over-runs and underestimation of testing resources are also observed in many surveys across organizations. One of the reasons for over-run of their schedule is lack of testing tools. Test automation is one of the main approaches to reduce time and potential human error in testing process and decrease overall testing costs.

Several studies show test automation is gradually gaining due importance in the software industry. Software testing involves identifying suitable testing methods, techniques or criteria and generation of test cases using identified criteria. Automation can be possible on all testing tasks but it is usually cost-effective for repetitive tasks, such as unit testing and regression testing, in which test cases are executed every time changes are made. Cost-effectiveness of automation increases every time an automated test case is executed.

Most of the potential benefits of automated test execution will be lost if the success or failure of test cases is not assessed. A test output evaluation may help in evaluating the automated test execution to determining passing or failure of the test case by comparing the actual and expected output. A test output evaluation is an essential part of test execution because a wide range and large number of test cases are executed many times and the behavior must be checked for every test case every time.

Though, the current software testing environments provide automated test execution. However, the test output evaluation is being performed manually. Therefore, there is a general need for a method and a system for automating test output evaluation. Several aspects of the present disclosure discloses a method and a system for automating test output evaluation as described in details in below sections.

SUMMARY

This disclosure discloses a method, a system and a computer program product for test output evaluation of a JAVA component. The java component and reference classes are received and non-private members of the Java component are identified using JAVA reflection API and the reference classes. An API structure comprising public members is extracted from the non-private members. Behavior checking expressions are received and selected corresponding to the public members. A Java source code comprising wrapper methods wherein the wrapper method corresponds to the one or more public members and a test output evaluation method comprising the behavior checking expressions is generated. The test output evaluation of the JAVA component is performed using the test output evaluation method over the generated Java source code.

In one embodiment, the API structure and the one or more behavior checking expressions can be stored in a grammar template. In another embodiment, the behavior checking expressions can be parsed and validated. In yet another embodiment, a status to the public members based on the corresponding behavior checking expressions can be assigned. Further, a message can be provided corresponding to the behavior checking expressions.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
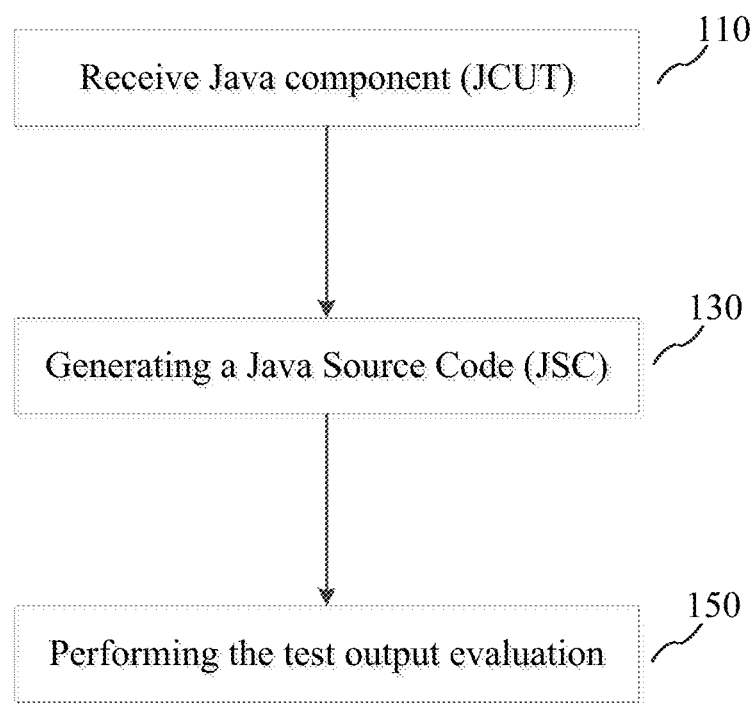
FIG. 1 illustrates a process flow for performing test output evaluation of a Java component.

FIG. 1 illustrates a process flow for performing test output evaluation of a Java component. The disclosed technique follows the automated test output evaluation technique using a test output evaluation tool in which the test output evaluation wraps around the Java component under test (herein after referred as "JCUT") and augments it with code to check its behavior. In step 110, the test output evaluation tool (herein after referred as "tool") accepts a JCUT. JCUT may comprise of source code or complied Java program as a class file. The tool extracts the JUCT non-private members, such as methods, constructors, exceptions and variables, to provide options for test output evaluation conditions.

At step 130, Java Source code (herein after referred as "JSC") is generated. JSC has the similar externally visible features in which an unwrapped original JCUT is used for actual function execution and the wrapper component for output evaluation. Each wrapper method calls the corresponding member method and local behaviour checking method to check behaviour of the JCUT. Each behaviour checking method checks behaviour of the JCUT method by calling other methods of the JCUT using its application programming interface (herein after referred as 'API'). The JSC generated is to be used in place of JCUT during testing process for test output evaluation. The disclosed technique can be applicable to any JCUT that is accessed through an API and any Java third-party or commercial off-the-shelf (herein after referred as 'COTS') components for which source code may not be available. An API defines how a component is accessed by other components. Generally, the API has a name and a collection of method signatures. A method signature consists of the name of the method and a number of inputs and outputs, including their types. The disclosed technique is independent of any test case generation or test execution tool and generic enough to use with any test case generation or test execution tool.

At step 150, test output evaluation methods compare actual states of the JCUT with expected states supplied by the user in terms of behaviour checking expressions using member methods of JCUT.

Figure 2:
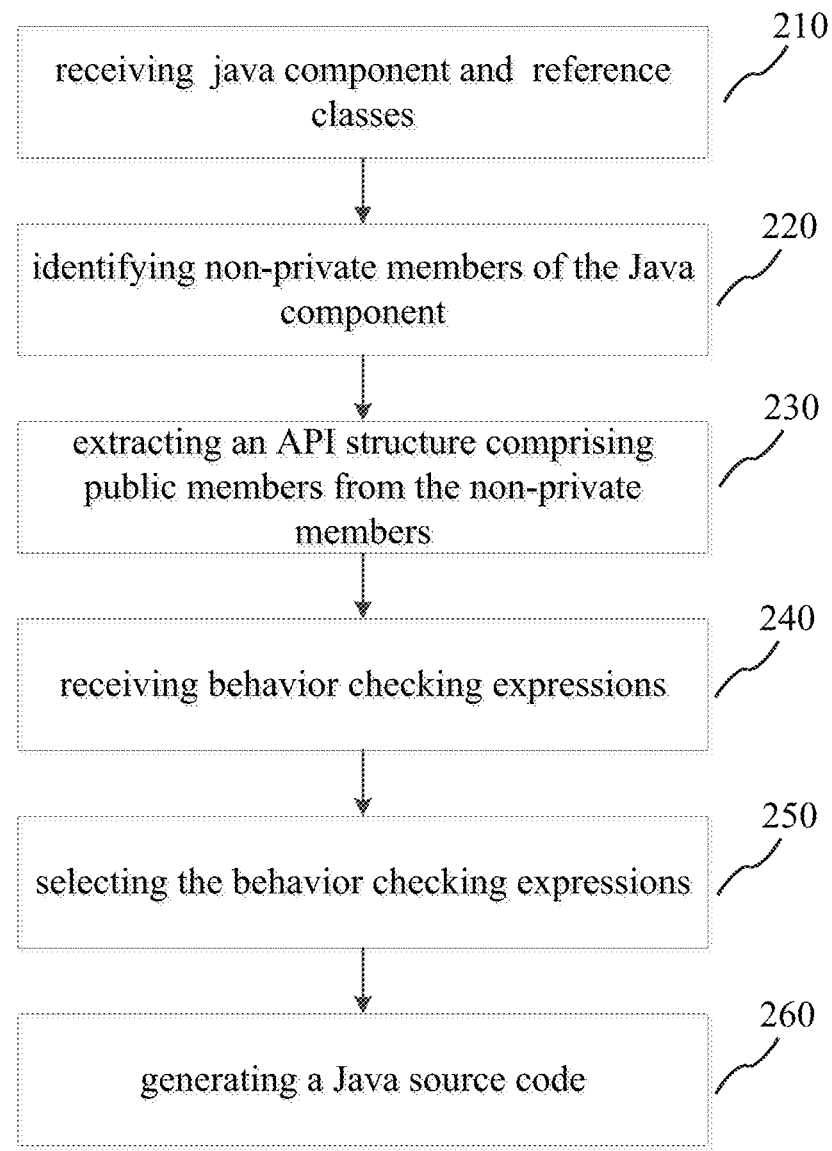
FIG. 2 illustrates a process flow for generating Java source code of the Java component.

FIG. 2 illustrates a process flow for generating Java source code of the Java component. The tool accepts JCUT and reference classes as input and obtains reflections that are processed and added into grammar template. User may enter behaviour checking conditions using Java expressions in Expressions and Identifiers sections of the grammar template. A Java expression is a construct made up of variables, literal values, operators, built-in functions and method invocations according to Java syntax which evaluates to a single value. The tool parses the expressions and creates a list of Java compatible conditions. User may assign corresponding condition from the list of conditions for each exception. User may also select corresponding condition for each public method and constructor, and may enter a message if user wants to display the message along with the error message generated by the tool when a test case fails. The tool displays generated JSC in an editor for the user to edit it if required.

The tool generates JSC which contains wrapper methods and test output evaluation methods for public methods and constructors of the JCUT. Constructors of the JCUT are considered member methods for producing their wrapper and test output evaluation methods. Wrapper methods capture pre-states, post-states and return values of the methods, check behaviour of the exceptions thrown by the methods and call corresponding test output evaluation methods using input parameters, return values, pre-states and post-states as parameters of the test output evaluation methods. Test output evaluation methods compare actual states of the JCUT with expected states supplied by the user in terms of behaviour checking expressions using member methods of JCUT. The details of the process of generating JSC are mentioned as follows:

Receiving JCUT (Step 210)

The tool may accept bytecode of JCUT and its reference classes. Bytecode refers to class file obtained when a Java source code is compiled. Reference classes are the classes used as object references inside JCUT. For easy input process, the tool is designed to accept bytecodes of JCUT and its reference classes in a zipped file. Uploaded zipped file may be unzipped by the tool.

Identifying Non-private Members (Step 220)

The tool uses component's own API for behaviour checking of JCUT. Hence, access to the structure of JCUT and its reference classes are critically important which may not be available in case of third party or COTS components. To address the issue of the access, we use Java Reflection API.

Java reflection consists of a set of programming interfaces which discover the structure of classes, methods, constructors and fields. The tool uses non-private reflected members due to no access to the private members of JCUT during test execution as the generated JSC inherits JCUT.

Extracting API Structure (Step 230)

The tool extracts API structure of JCUT and its reference classes using reflection. The reflected members include non-private methods, constructors and class fields. For each method, a Java signature string may be shown with its accessModifier, returnValueType for non-void method, methodName, parameterList and throwsExceptions if any. For each constructor, the same method signature string may be shown without returnValueType. Each parameter of all the methods and constructors may be renamed in order of appearance starting from param0, param1, param2 and so on in the signature string as Java reflection API does not have access to name of parameters. A Java signature string for each field may be shown with its accessModifier, dataType and fieldName assigned with a fieldValue if any.

In one embodiment, the tool generates a grammar template which contains all reflected non-private methods, constructors and variables of JCUT and reference classes, list of Java's standard operators as default operators for the user's reference and provides space for the user to enter Java expressions and identifiers. The default operators are all valid operators in Java, such as unary, multiplicative, additive, shift, relational, logical and ternary, that can be used in behaviour checking expressions.

Receive Behaviour Checking Expressions (Step 240)

The tool checks behaviour of constructors, exceptions and methods. The behaviour checking conditions in the grammar template using Java expressions may be provided by a user. A conditional statement is an expression that produces a true or false result which can help in determining whether a test case passes or fails during testing.

The tool enables the user to write behaviour checking expressions in Expressions section of the grammar template. The grammar template may be stored in a database. To reduce complexity and for reusability of sub-expressions, it is recommended to divide a complex expression into a set of sub-expressions using precedence order. In precedence order, later constructs bind tighter than earlier constructs. Each expression is written as <expression notation>:<expression> in which expression notation is a unique name that identifies expression. An expression contains valid Java operands with Java's standard operators. The operands can be direct references to the reflected members, method invocations and constants. User declares identifiers in Identifiers section of the grammar template to be used as operands in expressions. Identifiers can be reference to the reflected members, method invocations and state variables. The reflected members and method invocations can directly be used as operands in expressions as well as for simplicity they can be declared as identifiers. To assign a reflected member or method invocation as identifier, an identifier can be declared as <identifier notation>: <identifierReference>. State variables are implanted as local variables at appropriate places inside the wrapper methods to capture states of JCUT. A state variable is declared using the standard Java local variables declaration syntax with identifier notation as <identifier notation>: <dataType><variableName>=<value>. Each variableName should have a valid Java data type, such as byte, short, int, long, float, double, char or boolean. variableName should be declared using the standard Java naming conventions and value should be according to the scope of Java local variable values. However, for simplicity, the user may use three predefined keywords before<#>, after<#> and output as variableName to define states before and after calling a method, in which # can be from 0 to indicate number of such variables in the method, and output as return value of a non-void method. Although the tool takes care of return value of each non-void public method using keyword output and its usage in the wrapper and test output evaluation methods, the user may declare output with appropriate <dataType> for each non-void public method for the parser to recognise output during parsing process when output is used in a behaviour checking expression.

In one embodiment, if the output is insufficient for direct comparison with expected test outputs then user may supply declaration of identifiers, before and after, to capture pre and post states by calling other member methods of JCUT to be used for comparison of states. Similarly, to compare actual state and expected state of a void method the user may declare before and after identifiers as the tool compares the actual and expected outputs and also, the actual and expected states.

Each expression has a Java data type depending on the type of value, the expression can produce. The type of an expression is determined by the types of values and variables used in the expression. An expression may be as simple as a single variable name or value, or it may be a complex sequence of combination of the results of sub-expressions. For the purpose of illustration, withdrawal from a bank account should be less than or equal to the balance amount available in the account, then, an expression can be withdraw<=balance. Similarly, consider expression required for behaviour checking of a method, deposit (double amount), using another method, getBalance( ) from the inherited class. We are interested to check that summation of the deposited amount and the balance before deposit is equal to the balance after depositing the amount. In this case, return values of the getBalance( ) method are state variables, hence, need to declare them as identifiers. An identifier id1: double before0=super.getBalance( ) required before calling deposit(amount) and an identifier id2: double after 0=super.getBalance( ) required after calling deposit(amount). When we supply behaviour checking expression ex1: id2==id1+amount, where identifier references id1 and id2 are substituted by their corresponding variable names, which would place condition after0==before0+amount in the condition list after parsing.

In one embodiment, once behaviour checking expressions are entered inside the grammar file, the parser of the tool parses expression list from the grammar file, into a consolidated list of expressions and conditions for user. In order to ensure valid conditions are assigned, the parser performs parsing in various steps. Expressions written in precedence order may have lower order expressions and identifiers references. Each reference is resolved by search and substitution mechanism before a validity check for each expression is carried out. The identifier and expression lists are traversed individually to locate lower order notations, if any, corresponding values are substituted and nested accordingly. The same traversal process may be applied to remove identifier references inside an expression. While substituting an identifier in an expression or in another identifier, if the identifier is of reference type its specified value is substituted and if a variable type identifier is used the identifier reference is substituted with specified variable name. Data type of variable name and values are used to determine type of expression value during validity of the expression.

In another embodiment, the parser also checks validity of each expression and identifier. The validity is examined with respect to scope, inheritance, data type and operation rules. The tool uses Java Expression Library (JEL) to check if given expression is valid or not. JEL has certain limitations like, it is unable to handle inheritance usage and also does not recognise dynamic reference operator. The parser takes care of these limitations by handling exceptions thrown by JEL. All the invalid expressions and identifiers are discarded from the expressions list. All the conditional constructs occurring in the list of supplied expressions are identified and stored in a separate list to be used as behaviour checking conditions. For the purpose of illustration, let us consider expression ex1: id2==id1+amount from 'Express Behaviour checking Expression' in which id2 is substituted by variable name after0 of identifier id2 and id1 is substituted by variable name before0 of identifier id1. The identifiers id1 and id2 are declared using state variable keywords before and after. Therefore, after parsing expression after0==before0+amount is available in the list of conditions and, before0=super.getBalance( ) and after0=super.getBalance( ) are available in the list of state variables for user to use during assign conditions.

Selecting the Behavior Checking Expressions (Step 250)

Assigning appropriate behaviour checking conditions to the corresponding methods with relevant identifiers is crucial as an unrelated assigned condition will result into a meaningless JSC which will eventually produce wrong test output evaluation for the method in which unrelated condition is assigned. To minimize error in assigning conditions, we have divided the process into five steps:

(1) assign conditions and supply messages for exceptions;
(2) select a method;
(3) assign the pre and post states;
(4) assign conditions; and
(5) supply a message.

Assigning a condition is compulsory for each exception as an exception is supposed to handle such abnormal condition to prevent Java program termination.

The tool displays each exception one by one and user may assign corresponding condition from the list of conditions. The tool also provides a space if user wants to supply a message to be displayed along with automatically generated message for behaviour of the exception. Behaviour checking of a method is depending on the observability of the component's state through its API. Hence, the tool enables the user to select a method, from the list of reflected methods and constructors, for which a behaviour checking condition is available. For the tool, a constructor is a member method. After selecting a method, user may assign corresponding pre-state and post-state from the list of identifiers, if required for behaviour checking of the method, which are declared using keywords, before and after. User then assigns corresponding condition from the list of conditions and supplies a message if interested to display it along with the automated error message when a test case fails. The tool supports assigning of multiple conditions to a method as a method may require more than one conditions for its behaviour checking. User follows the same sequence of steps from (2) to (5) for each method for which behaviour checking condition is available. After assigning corresponding pre-states, post-states and conditions for all the methods, JSC can be generated to be used in place of JCUT during testing.

Generate JSC (Step 260)

Following the test output evaluation technique, the tool creates a skeleton of JSC containing wrapper methods and test output evaluation methods, and implants behaviour checking conditions and pre-state, post-state variables from user supplied expressions.

Illustrating the Skeleton of a Wrapper Method

Example 1 shows skeleton of a wrapper method. The tool generates signature for wrapper method using reflections. Then the tool declares and initialises output identifier to capture return value of non-void method to be used to return output as well as to be passed as a parameter to the test output evaluation method. The output is declared as Object to allow primitive and user defined returnValueType. The tool places the entire before and after declaration before and after calling the method, and passes the identifiers, before and after, as parameters to the test output evaluation method. The tool generates behaviour checking block for any exceptions thrown by the method. The tool sets a flag for an expected exception and a flag for a detected exception for each exception. The supplied precondition for exception is placed in the conditional statement to determine whether the exception is expected and the expected flag is set to 'expected'. The call to the JCUT method is generated in a try-catch block, return value of non-void method is captured in output identifier, and the detected flag is set to detect the exception for the exception that is signaled. The CheckExcBehaviour component is called for each exception with corresponding parameters, flags for the expected and detected exceptions, a string containing the exception and method name with user supplied message if any.

EXAMPLE 1

Wrapper Method

```
public <returnValueType> <methodName> (<parameterList>) {
    /* For return value of the method*/
    Object output = null;
    /* User supplied identifier to capture pre-state*/
    <dataType> before<#> = <value>;
    /* Behaviour checking block for exceptions */
    /* Flags for expected and detected exceptions */
    boolean expected<#>=FALSE, detected<#>=FALSE;
    if (<User supplied condition for exception>){
        expected<#> = TRUE;
    }
    try{
        /*Method call from super class*/
        output = super.methodName;
    }
    catch(<exception>){
        detected<#>=TRUE;
    }
    /* Calling behaviour checking component for each exception */
    CheckExcBehaviour.message(expected<#>,detected<#>,"<exception> in methodName"+<userSuppliedMessage>);
    /* User supplied identifier to capture post-state */
    <dataType> after<#> = <value>;
    /* Calling behaviour checking method */
    if(!expected<#> && !detected<#>){
        check<method_name>(<parameterList>,
        <(<returnValueType>)output>, <before<#>>,<after<#>>);
    }
    return (<returnValueType>)output;
}
```

The CheckExcBehaviour component is used for checking the exception behaviour and placed inside JSC. The source code of the CheckExcBehaviour component is listed in Example 2. The CheckExcBehaviour component takes a boolean value for the expected exception, a boolean value for the exception raised and a string representing the exception and method name to generate automatic error message with concatenated string of the user supplied message if any. The component then displays a corresponding message. Three types of messages are possible: Detected Exception, Exception Failed and Unexpected Exception. The Detected Exception indicates the exception was expected and was detected. The Detected Exception message reports the method behaved correctly but the test case used for testing may not be a valid test case. The Exception Failed displays the exception that was expected but not detected, and Unexpected Exception indicates that an exception was not expected but was detected. The Exception Failed and Unexpected Exception messages alert the user that the method did not behave correctly. The CheckExcBehaviour component does not generate any messages in the normal situation when the exception was neither expected nor signaled. The tool generates a call for behaviour checking method of the member method with inputs, output, pre-state and post-state parameters in the conditional statement in which the exception was neither expected nor signalled.

EXAMPLE 2

```
public class CheckExcBehaviour {
/* Print appropriate exception behaviour message
@param expected the boolean value of expected exception
@param detected the boolean value of exception raised in execution
@param name the name of exception, the method name and user supplied message
*/
public static void message(boolean expected, boolean detected, String name) {
if (expected && detected)
System.out.println("The exception " + name + " was expected and detected.");
else if (expected && !detected)
System.out.println("The exception " + name + " was expected but NOT detected.");
else if (!expected && detected)
System.out.println("The exception " + name + " was NOT expected but was detected.");
    }
}
```

Illustrating the Skeleton of a Test Output Evaluation Method

Example 3 shows skeleton of a test output evaluation method. The tool generates signature for test output evaluation method using the call to test output evaluation method generated in the wrapper method. Then the user supplied condition for behaviour checking is placed in the conditional statement. A string representing the test output evaluation method name with values of inputs, output, pre-state and post-state parameters is placed to generate automatic error message along with the user supplied message, if any, in the display statement to display the message if the condition fails.

To distinguish exceptions thrown by the method under test and other exceptions, the tool generates a try-catch block in wrapper and test output evaluation methods to handle exceptions thrown by the other member methods called which are used for state variables and behaviour checking conditions.

EXAMPLE 3

Test output evaluation method

```
private void <checkMethodName> (<parameterList>,
<(<returnValueType>)output>, <<dataType> before<#>>,
<<dataType> after<#>>){
    /* Behaviour checking block for method */
    If(!<User supplied behaviour checking condition>){
        /* Error message if above condition fails */
        System.out.println("<checkMethodName> error as values of
parameters are "+<parameter list>+<<returnValueType>output>+
<before<#>>+<after<#>>+<user supplied message>);
    }
}
```

The tool treats a constructor of JCUT as a member method for generation of wrapper and test output evaluation methods for the constructor. The generated JSC has the same API as JCUT, except that the methods do not signal any exceptions instead they check behaviour of any exceptions thrown by the JCUT. Although the parser has validated the user supplied expressions, the JSC may be erroneous due to error in assigning conditions to the corresponding methods. To support debugging by manual editing, the tool displays final JSC in an editor before saving the JSC on client machine.

Figure 3:
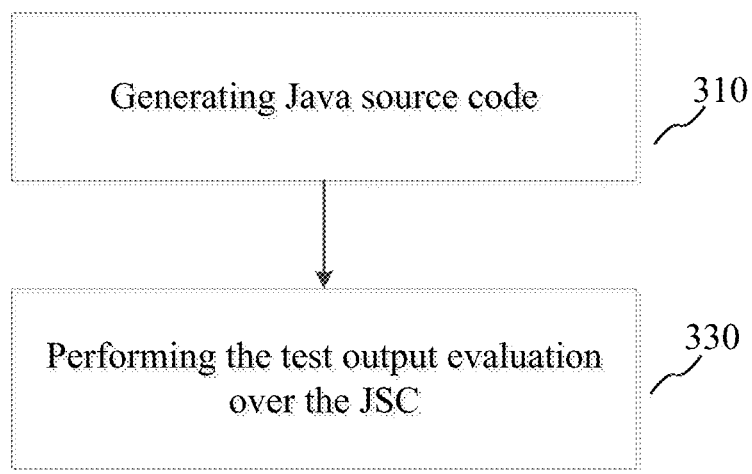
FIG. 3 illustrates an example process flow evaluating Java component using corresponding Java source code for test output evaluation.

FIG. 3 illustrates an example process flow evaluating Java component using corresponding Java source code for test output evaluation. At step 310, the JSC is generated as explained in detail with FIG. 2. At step 330, generated JSC is used in place of JCUT and be directly supplied with test cases to perform test output evaluation. The test cases may have been generated manually or come from a test case generation utility.

Figure 4:
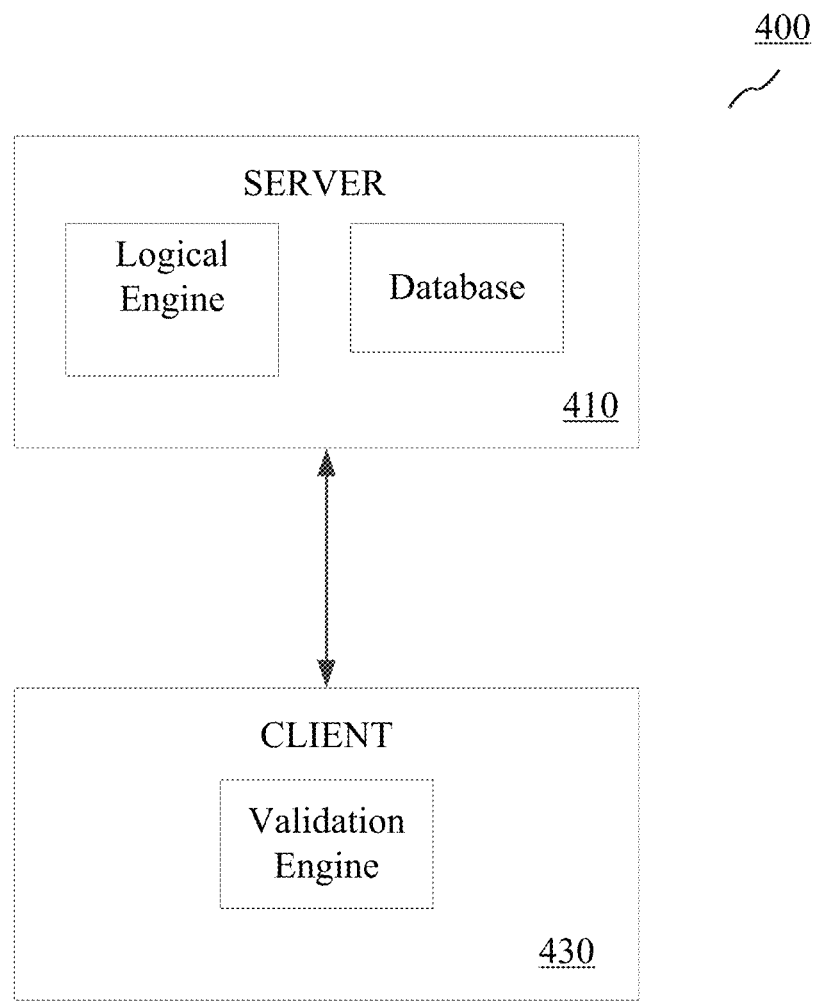
FIG. 4 shows an exemplary system for performing test output evaluation of a Java component.

FIG. 4 shows an exemplary system for performing test output evaluation of a Java component. The system 400 includes a server 410 (e.g., traditional computer server, or another type of computer, such as a desktop computer). In the system 400, the server 400 may store grammar templates as explained in FIG. 2 and other details of the Java component in a database (e.g., on local storage, such as a disk drive, or remote storage such as a storage area network system).

The server 410 also includes a logical engine. The logical engine performs the method of generating Java source code corresponding to the JCUT and determines test output evaluation of the JCUT. The logical engine can be implemented in software and/or hardware running on the server 410. The logical engine can perform any of the operations described herein (e.g., Receiving JCUT (Step 210), Identifying non-private members (Step 220), Extracting API structure (Step 230), Receive Behaviour Checking Expressions (Step 240), Selecting the behavior checking expressions (Step 250), Generate JSC (Step 260), and performing test output evaluation of JCUT 150).

The system 400 optionally includes a client 430 (e.g., a computer such as a desktop computer or another type of computing device) connected to the server (e.g., connected via a network, such as the Internet). The client may include a validation agent. Depending on the situation, the validation agent can be located at the server 410 or at the client 430, or both the server 410 and the client 430 can have the validation engine.

Illustrations Showing Application of Disclosed Technique

To check the usability and flexibility of the tool, we applied it to SymbolTable, PersonDAO and BankingService components.

Illustration 1: SymbolTable

The API of SymbolTable is shown in Example 4. SymbolTable stores pairs of symbols (strings) and identifiers (integers). Symbols and identifiers should be unique.

EXAMPLE 4

API for SymbolTable

```
public class SymbolTable {
    static final int MAX_SYMBOLS = 50;
    static final int MAX_SYM_LENGTH = 20;
    public SymbolTable( );
    public void insert (String sym) throws
        MaxLengthExc, FullExc, ExistSymExc;
    public int size( );
    public boolean existId (int id);
    public boolean existSym (String sym);
    public void del (int id) throws NotExistIdExc;
    public String getSym (int id) throws
        NotExistIdExc;
    public int getId (String sym) throws
        NotExistSymExc;}
```

The constant MAX_SYMBOLS indicates that a maximum of 50 symbols are allowed in the table and MAX_SYM_LENGTH indicates that the maximum length of a symbol is 20. The insert method adds a new symbol sym and assigns an identifier to it. The size method returns the number of pairs in the table. The method existId returns whether identifier id is in the table. The existSym method returns whether symbol sym occurs in the table. The del method deletes identifier id and its corresponding symbol from the table. The getSym and getId methods return the symbol and identifier for a given identifier and symbol respectively. The insert method throws MaxLengthExc if sym has more than MAX_SYM_LENGTH characters, FullExc if the table has MAX_SYMBOLS symbols in it and ExistSymExc if sym already exists in the table. The methods del and getSym throw NotExistIdExc if there is no identifier id in the table. The getId method throws NotExistSymExc, if sym is not in the table.

The grammar template with all the reflected members of SymbolTable and list of default operators is available to supply behaviour checking conditions in Expressions and Identifiers sections of the template. The signatures of reflected members are the same as the signatures in API of SymbolTable except input parameters are replaced by param<#>, such as input parameter sym of insert method is replaced with param0 and parameter id of existId method is replaced with param1. As an example, let us supply behaviour checking conditions for insert method. The insert method throws MaxLengthExc, FullExc and ExistSymExc exceptions and their preconditions can be written as param0.length( )>MAX_SYM_LENGTH, super.size( )> MAX_SYMBOLS and super.existSym(param0)==true respectively. The preconditions of the exceptions along with behaviour checking expression for insert method are depicted in Expressions and Identifiers sections of the template and shown in Example 6. The preconditions are declared in expressions E0, E1 and E2 respectively. For behaviour checking of insert method we are interested to check that after inserting input param0, the param0 symbol exists in the SymbolTable which we can check by calling the existSym method and also interested to check that the size was incremented correctly. The expressions E2 and E3 are for behaviour checking of insert method.

The tool generated implementation of wrapper method, insert and test output evaluation method for insert are shown in Example 6.

EXAMPLE 5

Behaviour Checking Expressions for Insert Method

```
@Expressions{
E0 : param0.length( ) > MAX_SYM_LENGTH
E1 : super.size( ) > MAX_SYMBOLS
E2 : super.existSym(param0)
E3 : Id1 == Id0 + 1 }
@Identifiers{
Id0 : int before0 = super.size( )
Id1 : int after0 = super.size( )}
```

Similarly, behaviour checking expression for constructor SymbolTable can be super.size( )==0; for existId expressions can be Id2: boolean output, Id3: super.getSym (param1) and E4: ((!Id2) && (Id3==null)||(Id2) && (Id3!=null)); for existSym expressions can be Id4: super.getId(param2) and E5: ((!Id2) && (Id4==−1)||(Id2) && (Id4!=−1)); precondition for NotExistIdExc in del can be E6: !super.existId(param3) and for del behaviour checking expression can be E7: ((Id1==Id0−1) && E6); precondition for NotExistIdExc in getSym can be E8: !super.existId (param4) and for getSym expressions can be Id5: String output, Id6: super.getId(output) and E9: param4==Id6; and precondition for NotExistSymExc in getId can be E10: !super.existSym(param5) and for getId behaviour checking expressions can be Id7: int output, Id8: super.getSym(output) and E11: param5==Id8. A behaviour checking expression for the size method is not provided, as the internal state for the size method is not observable through the API. However, the size method is used in the behaviour checking expressions of the insert and del methods and by that way behaviour of the size method can be observed through the insert and del methods.

EXAMPLE 6

Wrapper and Test Output Evaluation Methods for Insert

```
public void insert(String param0){
  boolean expected0 = false, detected0 = false, expected1 = false,
detected1 = false, expected2 = false, detected2 = false;
  int before0 = super.size( );
  /*Expected condition for MaxLengthExc*/
  if(param0.length( ) > MAX_SYM_LENGTH)
  expected0 = true;
  /*Expected condition for FullExc*/
  if(super.size( ) == MAX_SYMBOLS)
  expected1 = true;
  /*Expected condition for ExistSymExc*/
  if(super.existSym(param0))
  expected2 = true;
  try{
  super.insert(param0);
  }catch(MaxLengthExc e1){
  detected0 = true;
  }catch(FullExc e2){
  detected1 = true;
  }catch(ExistSymExc e3){
  detected2 = true;}
  CheckExcBehaviour.message(expected0,detected0," MaxLengthExc
in insert");
  CheckExcBehaviour.message(expected1,detected1," FullExc in
insert");
  CheckExcBehaviour.message(expected2,detected2," ExistSymExc in
insert");
  int after0 = super.size( );
  if(!expected0 && !detected0 && !expected1 && !detected1 &&
  !expected2 && !detected2)
  checkinsert(param0,before0,after0);
  }
  private void checkinsert(String param0, int before0, int after0){
  If(!((after0==before+1)&&(super.existSym(param0))))
  System.out.println ("insert error as values of parameters are"+
param0+","+before0+","+after0);
  }
```

Illustration 2: SetUniqueList

SetUniqueList is a part of commons-collections framework from Apache. Commons-collections implements commonly reusable collection data structures like Java Collections framework. SetUniqueList implements a set with no duplicate elements in it. Public API of SetUniqueList is shown in Example 7 asSet( ) gets an unmodifiable view for a given local set. add(Object) method adds an element to the list if it is not present, returns false if the element is already present in the list. add(int, Object) method adds an element at the specified index if it is not already present in the list. addAll(Collection) and addAll(int, Collection) add all the elements from the given collection at the end of the list and at given index respectively, avoiding duplicates and returns false if all the elements of the collection are already present in the list. set(int, Object) sets the value at the specified index. Any previous duplicate is removed and object is added to specified index. remove(int) removes the element at specified index and returns the removed object. removeAll(Collection) deletes all the elements occurring in the given collection from the list, returns true if all the elements of the collection are present in the list and hence removed. remove (Object) removes the specified object from the list if the element is present in the list else returns false. clear( ) deletes all the elements from the list. contains(Object) checks if the given object exists in the list and returns a Boolean value, whereas containsAll(Collection) returns true if all the elements of given Collection exists in the list. subList(int, int) returns a sub-list from-to the specified index. listIterator( ) and listIterator(int) allow element-by-element traversal of the list from current position and given index respectively.

EXAMPLE 7

API of SetUniqueList

```
public class SetUniqueList extends AbstractSerializableListDecorator {
public Set asSet( );
public boolean add(Object object) ;
public void add(int index, Object object) ;
public boolean addAll(Collection coll) ;
public boolean addAll(int index, Collection coll) ;
public Object set(int index, Object object)
public boolean remove(Object object)
public Object remove(int index)
public boolean removeAll(Collection coll)
public boolean retainAll(Collection coll)
public void clear( )
public boolean contains(Object object)
public boolean containsAll(Collection coll)
public Iterator iterator( )
```

-continued

```
public ListIterator listIterator( )
public ListIterator listIterator(int index)
  public List subList(int fromIndex, int toIndex)
}
```

The grammar template with all the reflected members of SetUniqueList and list of default operators is available to supply behaviour checking conditions in Expressions and Identifiers sections of the template. The signatures of reflected members are the same as the signatures in API of SetUniqueList except input parameters are replaced by <data type>Param, such as input parameter object of add method is replaced with ObjectParam and parameter index is replaced by intParam. As an example, let us supply behaviour checking expressions for add(Object) method. The behaviour checking expression for add method can be written as to check whether the object is added or not in the list. If the element already existed in the list, the method should return false, otherwise the object be added and method returns true. Also ensure whether the object exists in the list after the operation. Hence we have two behaviour checking conditions for add. We write these conditions as behaviour checking expressions in Expressions and Identifiers sections of the template and shown in Example 8.

EXAMPLE 8

Behaviour Checking Expressions for Add Method

```
@Expressions{
E0 : Id0 != Id2
E1 : Id1 == true
}
@Identifiers{
Id0 : int before0 = super.contains(ObjectParam)
Id1 : int after0 = super.contains(ObjectParam)
Id2 : boolean output
```

The expressions E0 and E1 are for behaviour checking of add method. The tool generated implementation of wrapper method, add and test output evaluation method for add are shown in Example 9.

EXAMPLE 9

Wrapper and Test Output Evaluation Methods for Add

```
public boolean add(Object ObjectParam){
  Object output = null;
  try{
  boolean before0 = super.contains(ObjectParam);
  output = super.add(ObjectParam);
  boolean after0 = super.contains(ObjectParam);
  check_add(ObjectParam, (Boolean)output, before0, after0);
  }catch(Exception e){
System.out.println("Exception thrown from method called in behaviour checking conditions");
  }
  return (Boolean)output;
}
```

```
private void check_add(Object ObjectParam,boolean output, boolean
before0, boolean before1, boolean after0, boolean after1)  throws
Exception {
  if(!(before0 != output))
System.out.println("add error as values of parameters are ObjectParam,
(Boolean)output, before0, after0 and output should be true only if object
didn't exist in the list before adding.");
  if(!(after0 == true) )
System.out.println("add error as values of parameters are ObjectParam,
(Boolean)output, before0, after0 and irrespective of the output, the object
should exist in the list after adding.");
}
```

Similarly, behaviour checking expressions for asSet method can be E2: Id3!=null and E3: Id3.equals(org.apache.commons.collections.set.UnmodifiableSet.decorate (set)) where Id3: Set output. For add(int, Object) expressions can be E4: (Id0==true&&Id4==Id5)||(Id0==false&&Id4+1==Id5) and E5: Id1==true with identifiers Id4: int before1=set.size( ) Id5: int after1=set.size( ) for clear expression can be E6: (set.size( )=0) && (getList( ).size( )=0). Behaviour checking expression for contains(Object) can be E7: set.contains(ObjectParam)==Id2 and for addAll(int, Collection), it can be written as E8: (Id2==true&&Id5>Id4)||(Id2==false&&Id5==Id4) and for addAll(Collection), E9: (Id7!=Id2)&&Id8==true with identifiers Id7: boolean before0=super.containsAll(CollectionParam) and Id8: boolean after0=super.containsAll(CollectionParam). For remove (Object), the expression can be written as E10: (Id0==Id2 && Id1==false) whereas for remove(int, Object), E11: super.contains(Id9)==false && (Id9==Id10) and E12: Id9 !=null where Id9: Object output and Id10: Object before0=getList( ).get(intParam). Behaviour checking expression for containsAll(Collection) can be E13: Id2==set.containsAll(CollectionParam) and for removeAll (Collection), expressions are E14: Id11==false||(Id12==0 && Id11==true) and E15: (Id12 !=0)==Id2 where Id11: boolean after 0=super.containsAll(CollectionParam) and Id12: CollectionParam.size( ) Behaviour checking of retainAll can be carried using expressions, E16: Id15==true and E17: (Id13==Id14) !=Id2 where Id13: int before0= getList( ).size( ), Id14: int after 0=getList( ).size( ), Id15: boolean after1=CollectionParam.containsAll(getList( )) and for subList expressions can be, E18: Id16!=null, E19: Id16.size( )==(intParam1-intParam) and E20: Id16.equals (Id17.subList(intParam, intParam1)) where Id16: java.util. List output and Id17: java.util.List before0=getList( ).

For listIterator and Iterator behaviour checking components were added during manual editing of SetUniqueList_TO as to examine the implementation, loop over the respective iterators could not be written in a single line conditional construct.

Illustration 3: COMPLEX

Complex is a part of commons-math3 framework from Apache. Commons Math is a library of lightweight, self-contained mathematics and statistics components. Complex handles representation of a Complex number, i.e. a number which has both a real and imaginary part and implements arithmetic operations on complex numbers including Double.NaN(Not a number) and Double. POSITIVE_INFINITY defined in java.lang.Math.

Complex has two public constructors. Complex(double real) creates a complex number having only the real part whereas Complex(double real, double imaginary) creates a complex number with both real and imaginary parts given.

Methods like is NaN and is Infinite, check if given complex number is not a number or represent infinity(either positive or negative) respectively. Equals method checks the equality of two Complex objects. toString returns String notation for a complex number(<real>+i<imaginary>). All the methods for performing arithmetic operations using Complex numbers including add, subtract, multiply, divide, sin, cos, tan, conjugate, hashcode, sin h, cos h, tan h, abs, log, pow, negate, a sin, a cos, a tan and others are available in Complex. We applied tool to produce test output evaluation class Complex_TO for Complex. Behaviour checking expressions for each component were written to ensure that each method handles NaN, Infinity and all double values well and deliver appropriate output. Let us consider add (Complex)to illustrate supply of behaviour checking expressions and how the test output evaluation method is generated. We are required to write behaviour checking expression for add(Complex) method and for the NullPointerException (declared in org.apache.commons.math3.exception but java.lang) it throws. We supply the expressions for add(Complex)in the generated grammar template as shown in Example 10.

EXAMPLE 10

Behaviour Checking Expressions for Add Method

```
@Expressions{
E0 : ComplexParam == null
E1 : output.isNaN( )
E2 : E1 ==(isNaN( )||Double.isNaN(doubleParam))
E3 : E1 ||
(output.getReal( )==getReal( )+ComplexParam.getReal( ) &&
output.getImaginary( )==getImaginary( )+ComplexParam.getImaginary( ))
}
@Identifiers{
Id0 : Complex output
}
```

The expressions E1 and E2 are for behaviour checking of add(Complex) method whereas E0 is behaviour checking expression for NullPointerException. The tool generated implementation of wrapper method, add and test output evaluation method for add are shown in Example 11.

EXAMPLE 11

Wrapper and Test Output Evaluation Methods for Add

```
public Complex add(Complex ComplexParam){
Object output=null;
  try{
    boolean expected0=false, detected0=false;
    /*Expected condition for NullArgumentException*/
    if(ComplexParam == null)
      expected0=true;
      try{
        output=super.add(ComplexParam);
      }catch(org.apache.commons.math3.exception.
      NullArgumentException e){
        detected0=true;
      }
CheckExcBehaviour.message(expected0,detected0,
"org.apache.commons.math3.exception.
```

-continued

```
NullArgumentException in add as addend cannot be null");
    if(!expected0 && !detected0 )
      check_add(ComplexParam, (Complex) output);
  }catch(Exception e){
System.out.println("Exception thrown from method called in behaviour checking conditions");
    }
    return (Complex)output;
}
private void check_add(Complex ComplexParam, Complex output){
    if(!(output.isNaN( )==(isNaN( )||ComplexParam.isNaN( )))){
    System.out.println("add error as values of parameters are
ComplexParam, (Complex)output, and output should be NaN if either of
the addend is NaN.");
    }
if(!( output.isNaN( ) || (output.getReal( )==getReal( )+
ComplexParam.getReal( ) && output.getImaginary( )==getImaginary( )+
ComplexParam.getImaginary( )))){
    System.out.println("add error as values of parameters are
ComplexParam, (Complex)output, and if output is not NaN then real and
imaginary parts of both addends are added separately.");
}
}
```

Similarly, behaviour checking expression for all the methods are written using rules for each operation and hence added to Complex_TO.

Exemplary Computing Environment

Figure 5:
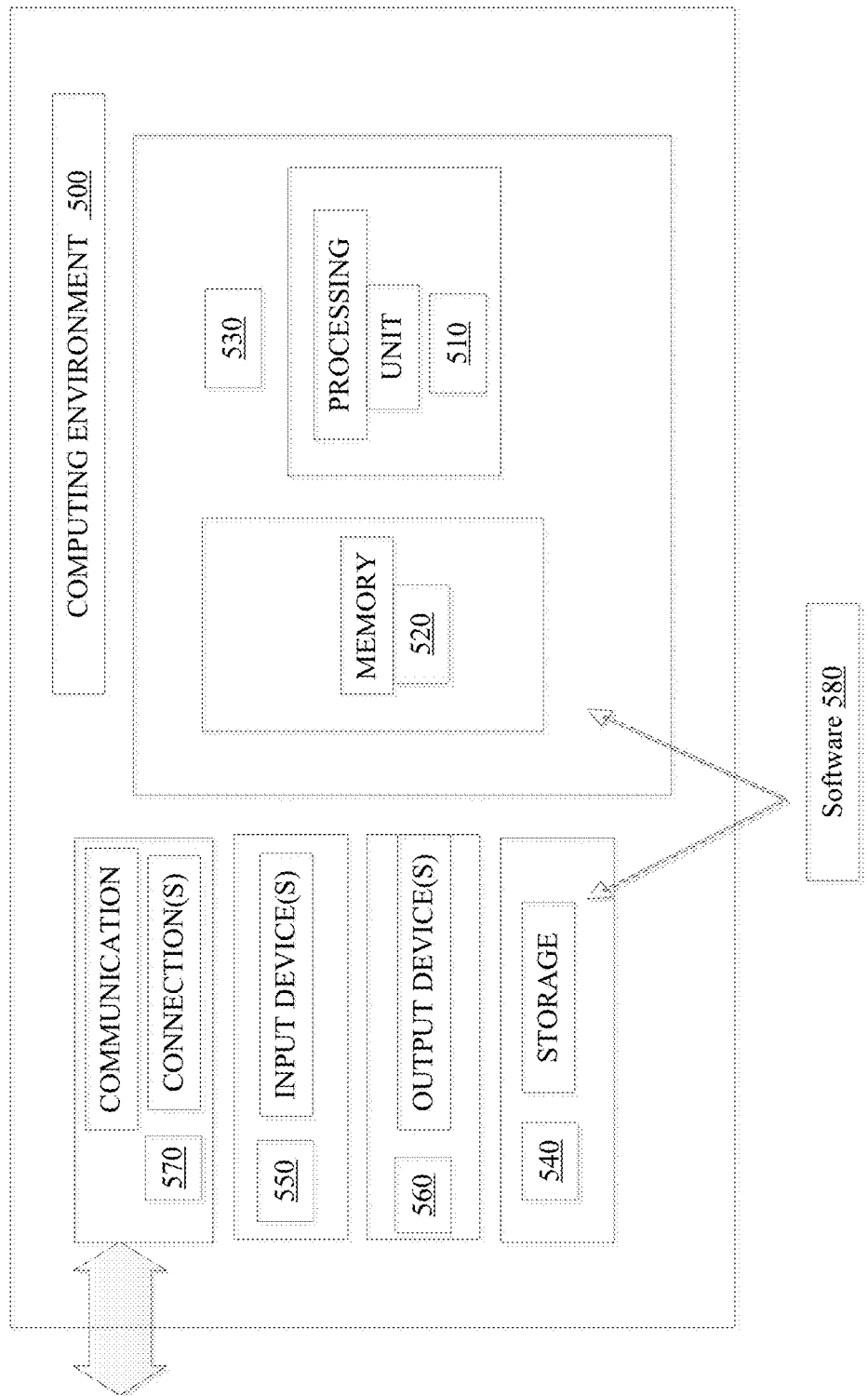
FIG. 5 shows an exemplary computing device useful for performing processes disclosed herein.

One or more of the above-described techniques may be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which may be used to store information and which may be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for test output evaluation of a JAVA Component Under Test ("JCUT"), the method comprising:
   receiving, by at least one of the one or more computing devices, bytecode corresponding to the JCUT and one or more reference classes referenced by the JCUT;
   identifying, by at least one of the one or more computing devices using a JAVA reflection Application Program Interface ("API"), one or more non-private members of the JCUT including one or more object references referring to the one or more reference classes, wherein the one or more non-private members comprise one or more public methods of the JCUT;
   extracting, by at least one of the one or more computing devices, an API structure of the JCUT and the one or more reference classes, based on the one or more public methods of the JCUT;
   storing, by the at least one of the one or more computing devices, the API structure of the JCUT and the one or more reference classes in a JCUT grammar template in a database;
   receiving, by at least one of the one or more computing devices, expressions comprising one or more expression identifiers, one or more conditions, expressions for capturing pre-execution states of the JCUT, and expressions for capturing post-execution states of the JCUT, wherein the one or more expression identifiers are associated with the one or more non-private members of the JCUT;
   storing, by the at least one of the one or more computing devices, the expressions in the JCUT grammar template in the database;
   assigning, by at least one of the one or more computing devices, a condition of one of the expressions to a public method of the one or more public methods of the JCUT;
   assigning an expression, of the expressions, to the public method to capture a pre-execution state of the JCUT;
   assigning another expression, of the expressions, to the public method to capture a post-execution state of the JCUT;
   retrieving, by the at least one of the one or more computing devices, the assigned condition, the assigned expression to capture the pre-execution state of the JCUT for the public method, and the assigned another expression to capture the post-execution state of the JCUT for the public method from the JCUT grammar template in the database;
   generating, by at least one of the one or more computing devices, a JAVA Source Code ("JSC") comprising a wrapper method for the public method, wherein the wrapper method, when executed:
     executes the assigned expression to capture the pre-execution state of the JCUT,
     evaluates the assigned condition to determine whether an exception is expected when the public method is invoked,
     executes the public method,
     executes the assigned another expression to capture the post-execution state of the JCUT, and
     determines whether the exception occurred when the public method was executed;
   generating an executable version of the JSC comprising an executable version of the wrapper method; and
   testing, by at least one of the one or more computing devices, the JCUT by executing the executable version of the wrapper method and evaluating the state of the executable version of the wrapper method, wherein the evaluating the state of the executable version of the wrapper method comprises comparing the captured post-execution state of the JCUT to an expected post-execution state of the JCUT.

2. The method of claim 1, wherein the one or more non-private members comprise methods, constructors, and class fields.

3. The method of claim 1, wherein the evaluation step further includes evaluating the state of at least one of the one or more non-private members using at least one of the expressions during execution of the executable version of the wrapper method.

4. The method of claim 1, wherein the assigning step further comprises:
   parsing, by at least one of the one or more computing devices, the expressions; and
   validating, by at least one of the one or more computing devices, the expressions by confirming the one or more conditions and the one or more identifiers relate to the public method.

5. The method of claim 1, further comprising:
   assigning, by at least one of the one or more computing devices, a status to the public method based on a status of the assigned condition.

6. The method of claim 1, wherein:
the expressions further include one or more messages relating to the one or more conditions; and
the method further comprises receiving, by at least one of the one or more computing devices, a message corresponding to one or more of the expressions, wherein the JSC is configured to output the message when at least one of the one or more conditions is satisfied.

7. An apparatus for executing the test output evaluation of a JAVA Component Under Test ("JCUT"), the apparatus comprising:
one or more processors; and
one or more memories operatively coupled to at least one or more processors and having instructions stored thereon that, when executed by-at least one of the one or more processors, cause at least one of the one or more processors to:
receive bytecode corresponding to the JCUT and one or more reference classes referenced by the JCUT;
use a JAVA reflection Application Program Interface ("API") to identify one or more non-private members of the JCUT including one or more object references referring to the one or more reference classes, wherein the one or more non-private members comprise one or more public methods of the JCUT;
extract an API structure of the JCUT and the one or more reference classes based on the one or more public methods of the JCUT;
store the API structure of the JCUT and the one or more reference classes in a JCUT grammar template in a database;
receive expressions comprising one or more expression identifiers, one or more conditions, one or more expressions for capturing pre-execution states of the JCUT, and one or more expressions for capturing post-execution states of the JCUT, wherein the one or more expression identifiers are associated with the one or more non-private members;
store the expressions in the JCUT grammar template in the database;
assign a condition one of the expressions to a public method of the one or more public methods of the JCUT;
assign one of the expressions to the public method to capture a pre-execution state of the JCUT;
assign another of the expressions to the public method to capture a post-execution state of the JCUT;
retrieve the assigned condition, the assigned expression to capture the pre-execution state of the JCUT for the public method, and the assigned another expression to capture the post-execution state of the JCUT for the public method from the JCUT grammar template in the database;
generate a JAVA Source Code ("JSC") comprising a wrapper method for the public method, wherein the wrapper method, when executed:
executes the assigned expression to capture the pre-execution state of the JCUT,
evaluates the assigned condition to determine whether an exception is expected when the public method is executed,
executes the public method,
executes the assigned another expression to capture the post-execution state of the JCUT, and
determines whether the exception occurred when the public method was executed;
generate an executable version of the JSC, comprising an executable version of the wrapper method; and
test the JCUT by invoking the executable version of the wrapper method and evaluating the state of the executable version of the wrapper method, wherein the evaluating the state of the executable version of the wrapper method comprises comparing the captured post-execution state of the JCUT to an expected post-execution state of the JCUT.

8. The apparatus of claim 7, wherein the one or more non-private members comprise: methods, constructors, and class fields.

9. The apparatus of claim 7, wherein at least one of the one or more memories has further instructions stored thereon that, when executed by at least one of the one or more processors, cause at least one of the one or more processors to:
further test the wrapper method by evaluating the state of at least one of the one or more non-private members using at least one of the expressions during execution of the executable version of the wrapper method.

10. The apparatus of claim 7, wherein at least one of the one or more memories has further instructions stored thereon that, when executed by at least one of the one or more processors, cause at least one of the one or more processors to assign the condition of the expression to the public method by:
parsing one or more of the expressions; and
validating the one or more of the expressions by confirming the one or more conditions and the one or more identifiers relate to the one or more public methods.

11. The apparatus of claim 7, wherein at least one of the one or more memories has further instructions stored thereon that, when executed by at least one of the one or more processors, cause at least one of the one or more processors to:
assign a status to the public method based on a status of the assigned condition.

12. The apparatus of claim 7, wherein at least one of the one or more memories has further instructions stored thereon that, when executed by at least one of the one or more processors, cause at least one of the one or more processors to:
receive a message corresponding to one or more of the expressions, wherein the JSC is configured to output the message when at least one of the one or more conditions is satisfied.

13. At least one non-transitory computer-readable medium storing computer-readable instructions that, when executed by one or more computing devices, cause at least one of the one or more computing devices to:
receive a bytecode corresponding to JAVA Component Under Test ("JCUT") and one or more reference classes referenced by the JCUT;
use a JAVA reflection Application Program Interface ("API") to identify one or more non-private members of the JCUT including one or more object references referring to the one or more reference classes, wherein the one or more non-private members comprise one or more public methods of the JCUT;
extract an API structure of the JCUT and the one or more reference classes, based on the one or more public methods of the JCUT;
store the API structure of the JCUT and the one or more reference classes in a JCUT grammar template in a database;

receive expressions comprising one or more expression identifiers, one or more conditions, one or more expressions for capturing pre-execution states of the JCUT, and one or more expressions for capturing post-execution states of the JCUT, wherein the one or more expression identifiers are associated with the one or more non-private members of the JCUT;

store the expressions in the JCUT grammar template in the database;

assign a condition of one of the expressions to a public method of the one or more public methods of the JCUT;

assign one of the expressions to the public method to capture a pre-execution state of the JCUT;

assign another of the expressions to the public method to capture a post-execution state of the JCUT;

retrieve the assigned condition, the assigned expression to capture the pre-execution state of the JCUT for the public method, and the assigned another expression to capture the post-execution state of the JCUT for the public method from the JCUT grammar template in the database;

generate JAVA Source Code ("JSC") comprising a wrapper method for the public method, wherein the wrapper method, when executed:

executes the assigned expression to capture the pre-execution state of the JCUT, evaluates the assigned condition to determine whether an exception is expected when the public method is executed, executes the public method, executes the assigned another expression to capture the post-execution state of the JCUT, and determines whether the exception occurred when the public method was executed;

generate an executable version of the JSC, comprising an executable version of the wrapper method; and test the JCUT by executing the executable version of the wrapper method and evaluating a state of the executable version of the wrapper method, wherein the evaluating the state of the executable version of the wrapper method comprises comparing the captured post-execution state of the JCUT to an expected post-execution state of the JCUT.

14. The at least one non-transitory computer-readable medium of claim 13, wherein testing the JCUT further includes evaluating the state of at least one or more non-private members using at least one of the expressions during execution of the executable version of the wrapper method.

15. The at least one non-transitory computer-readable medium of claim 13, further storing computer-readable instructions that, when executed by at least one of the one or more computing devices, cause at least one of the one or more computing devices to assign the condition of the expression to the public method by:

parsing one or more of the expressions; and validating the one or more of the expressions by confirming the one or more conditions and the one or more identifiers relate to the one or more public methods.

16. The at least one non-transitory computer-readable medium of claim 13, further storing computer-readable instructions that, when executed by at least one of the one or more computing devices, cause at least one of the one or more computing devices to:

assign a status to the public method based on a status of the assigned condition.

17. The at least one non-transitory computer-readable medium of claim 13, further storing computer-readable instructions that, when executed by at least one of the one or more computing devices, cause at least one of the one or more computing devices to:

receive a message corresponding to one or more of the expressions, wherein the JSC is configured to output the message when at least one of the one or more conditions is satisfied.

* * * * *